US009854225B2

(12) United States Patent
Kimura et al.

(10) Patent No.: US 9,854,225 B2
(45) Date of Patent: Dec. 26, 2017

(54) IMAGING UNIT INCLUDING A CHASSIS AND HEAT TRANSFER MEMBER

(71) Applicants: Tomonori Kimura, Kanagawa (JP); Shu Kambe, Kanagawa (JP); Maiko Yasui, Kanagawa (JP); Shuji Takamatsu, Kanagawa (JP); Masashi Adachi, Kanagawa (JP)

(72) Inventors: Tomonori Kimura, Kanagawa (JP); Shu Kambe, Kanagawa (JP); Maiko Yasui, Kanagawa (JP); Shuji Takamatsu, Kanagawa (JP); Masashi Adachi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 210 days.

(21) Appl. No.: 14/740,597

(22) Filed: Jun. 16, 2015

(65) Prior Publication Data

US 2016/0006911 A1    Jan. 7, 2016

(30) Foreign Application Priority Data

Jul. 1, 2014   (JP) ................................. 2014-136039

(51) Int. Cl.
*H04N 13/02* (2006.01)
*H04N 5/247* (2006.01)
*H04N 5/225* (2006.01)
*B60R 11/04* (2006.01)
(Continued)

(52) U.S. Cl.
CPC ......... *H04N 13/0239* (2013.01); *B60R 11/04* (2013.01); *H04N 5/2252* (2013.01); *H04N 5/247* (2013.01); *B60R 2300/107* (2013.01); *G03B 17/55* (2013.01); *G03B 35/08* (2013.01);
*H04N 5/2251* (2013.01); *H04N 5/2253* (2013.01); *H04N 5/2257* (2013.01); *H04N 2213/001* (2013.01)

(58) Field of Classification Search
None
See application file for complete search history.

(56) References Cited

U.S. PATENT DOCUMENTS

| 6,811,330 | B1 | 11/2004 | Tozawa |
| 7,872,813 | B2 | 1/2011 | Kimura et al. |
| 8,009,228 | B2 | 8/2011 | Kimura et al. |

(Continued)

FOREIGN PATENT DOCUMENTS

| JP | 2001-088623 | 4/2001 |
| JP | 2003-300414 | 10/2003 |

(Continued)

*Primary Examiner* — Justin P Misleh
(74) *Attorney, Agent, or Firm* — Oblon, McClelland, Maier & Neustadt, L.L.P.

(57) ABSTRACT

An imaging unit includes a plurality of imaging devices configured to capture images of an object; a circuit substrate configured to generate image data based on the images captured by the imaging devices; a chassis that holds the imaging devices; and a heat transfer member including a contacting portion configured to contact an installed member in a case where the imaging unit is installed on the installed member. The heat transfer member contacts the chassis or the circuit substrate, and heat conductivity of the heat transfer member is greater than the heat conductivity of the chassis.

15 Claims, 9 Drawing Sheets

(51) Int. Cl.
*G03B 17/55* (2006.01)
*G03B 35/08* (2006.01)

(56) References Cited

U.S. PATENT DOCUMENTS

| | | | |
|---|---|---|---|
| 8,191,986 B2 | 6/2012 | Takahashi et al. |
| 8,215,743 B2 | 7/2012 | Takei et al. |
| 8,248,672 B2 | 8/2012 | Kimura |
| 8,254,128 B2 | 8/2012 | Yasui |
| 8,424,997 B2 | 4/2013 | Kobayashi et al. |
| 8,456,569 B2 | 6/2013 | Kaga et al. |
| 8,491,080 B2 | 7/2013 | Sakurada et al. |
| 8,562,096 B2 | 10/2013 | Kimura et al. |
| 8,638,390 B2 | 1/2014 | Shinohara et al. |
| 8,736,753 B2 | 5/2014 | Kaga et al. |
| 8,792,050 B2 | 7/2014 | Shinohara et al. |
| 8,827,401 B2 | 9/2014 | Kimura et al. |
| 8,836,853 B2 | 9/2014 | Shinohara et al. |
| 8,911,112 B2 | 12/2014 | Takamatsu et al. |
| 8,922,859 B2 | 12/2014 | Takamatsu |
| 8,931,111 B2 | 1/2015 | Kimura |
| 2009/0135246 A1 | 5/2009 | Uchiyama et al. |
| 2012/0242785 A1* | 9/2012 | Sasagawa ............... H04N 5/247 348/36 |
| 2014/0146332 A1 | 5/2014 | Watanabe et al. |
| 2014/0285711 A1* | 9/2014 | Umehara ............ H04M 1/0264 348/373 |
| 2015/0256729 A1* | 9/2015 | Wato .................... H04N 5/2252 348/311 |
| 2016/0119514 A1* | 4/2016 | Sugimura ............. G03B 17/55 348/148 |

FOREIGN PATENT DOCUMENTS

| | | |
|---|---|---|
| JP | 2007-225543 | 9/2007 |
| JP | 4194180 | 12/2008 |
| JP | 2011-102942 | 5/2011 |
| JP | 2012-189324 | 10/2012 |
| JP | 2014-052335 | 3/2014 |

\* cited by examiner

IMAGING UNIT INCLUDING A CHASSIS AND HEAT TRANSFER MEMBER

BACKGROUND OF THE INVENTION

1. Field of the Invention

The disclosures herein generally relate to an imaging unit.

2. Description of the Related Art

Recently, image processing technologies have been remarkably improved. Moreover, since high-performance cameras became available at relatively low prices, applied technologies of cameras have been in practical use. For example, a stereo range finding technology, such as a stereo camera, in which plural cameras are mounted on a chassis and a distance to an imaged object is measured based on images captured by the respective cameras, has been known. Applications of the stereo range finding technology to various fields are examined.

In the case of the stereo camera or the like, it is quite important to eliminate an influence of heat as much as possible so as to be accurate, irrespective of an installation environment. For example, Japanese Published Patent Application No. 2007-225543 discloses a configuration for reducing an influence on a stereo camera accompanying a rise in ambient temperature in an installation environment from a perspective of ranging accuracy.

On the other hand, recently, upgrading and miniaturization of stereo cameras have been promoted, and a problem of a rise in temperature associated with heat generated at a component mounted inside a stereo camera has become evident. When a temperature inside the stereo camera rises, a failure risk of the mounted component increases. Therefore, a configuration that performs heat transfer or heat dissipation effectively has been required from a perspective of extending service life.

SUMMARY OF THE INVENTION

It is a general object of at least one embodiment of the present invention to provide an imaging unit that substantially obviates one or more problems caused by the limitations and disadvantages of the related art.

In one embodiment, an imaging unit includes a plurality of imaging devices configured to capture images of an object; a circuit substrate configured to generate image data based on the images captured by the plurality of imaging devices; a chassis that holds the plurality of imaging devices; and a heat transfer member including a contacting portion configured to contact an installed member in a case where the imaging unit is installed on the installed member. The heat transfer member contacts the chassis or the circuit substrate. Heat conductivity of the heat transfer member is greater than the heat conductivity of the chassis.

In another embodiment, an imaging unit includes a plurality of imaging devices configured to capture images of an object; a circuit substrate configured to generate image data based on the images captured by the plurality of imaging devices, the circuit substrate including an image processing substrate configured to generate the image data based on electric signals generated based on the images; a chassis that holds the plurality of imaging devices; and a heat transfer member arranged so as to contact the chassis and the image processing substrate inside the chassis.

According to the embodiment of the present application, an imaging unit, in which temperature rise can be suppressed, is provided.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

Figure 1:
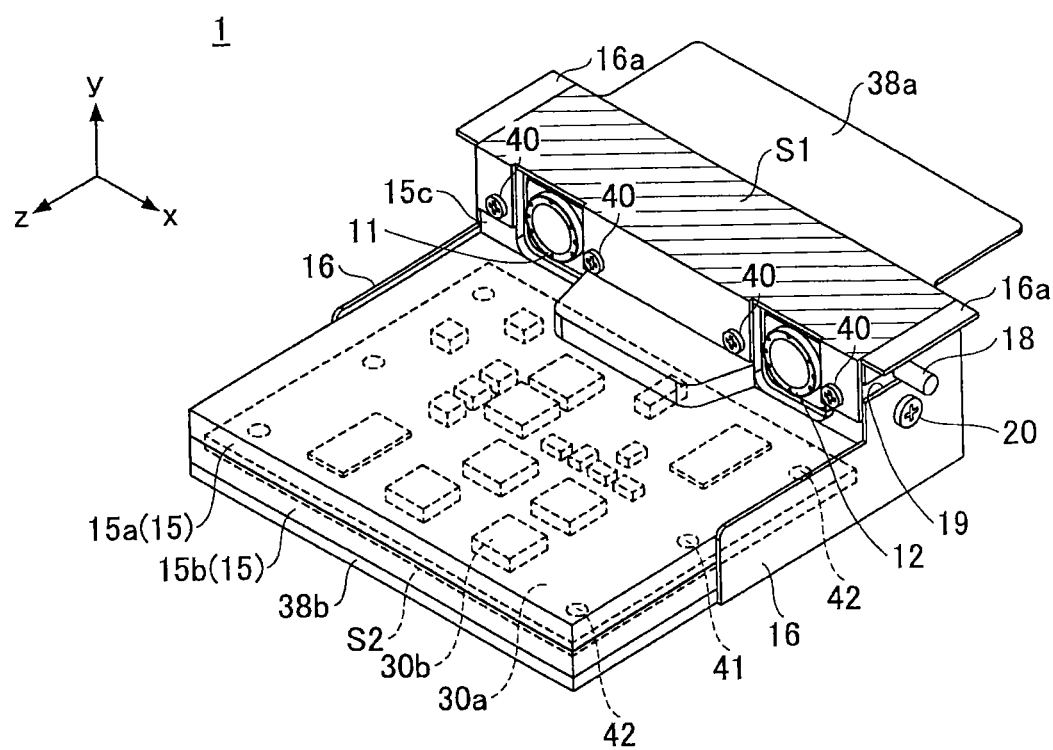
FIG. 1 is a perspective diagram for explaining an example of an overall configuration of an imaging unit according to a first embodiment.

In the following, embodiments of the present invention will be described with reference to the accompanying drawings. Meanwhile, in the present specification and drawings, the same reference numeral is assigned to the same component, and duplicate explanation will be omitted.

[First Embodiment]

<Configuration of Imaging Unit 1>

Figure 2:
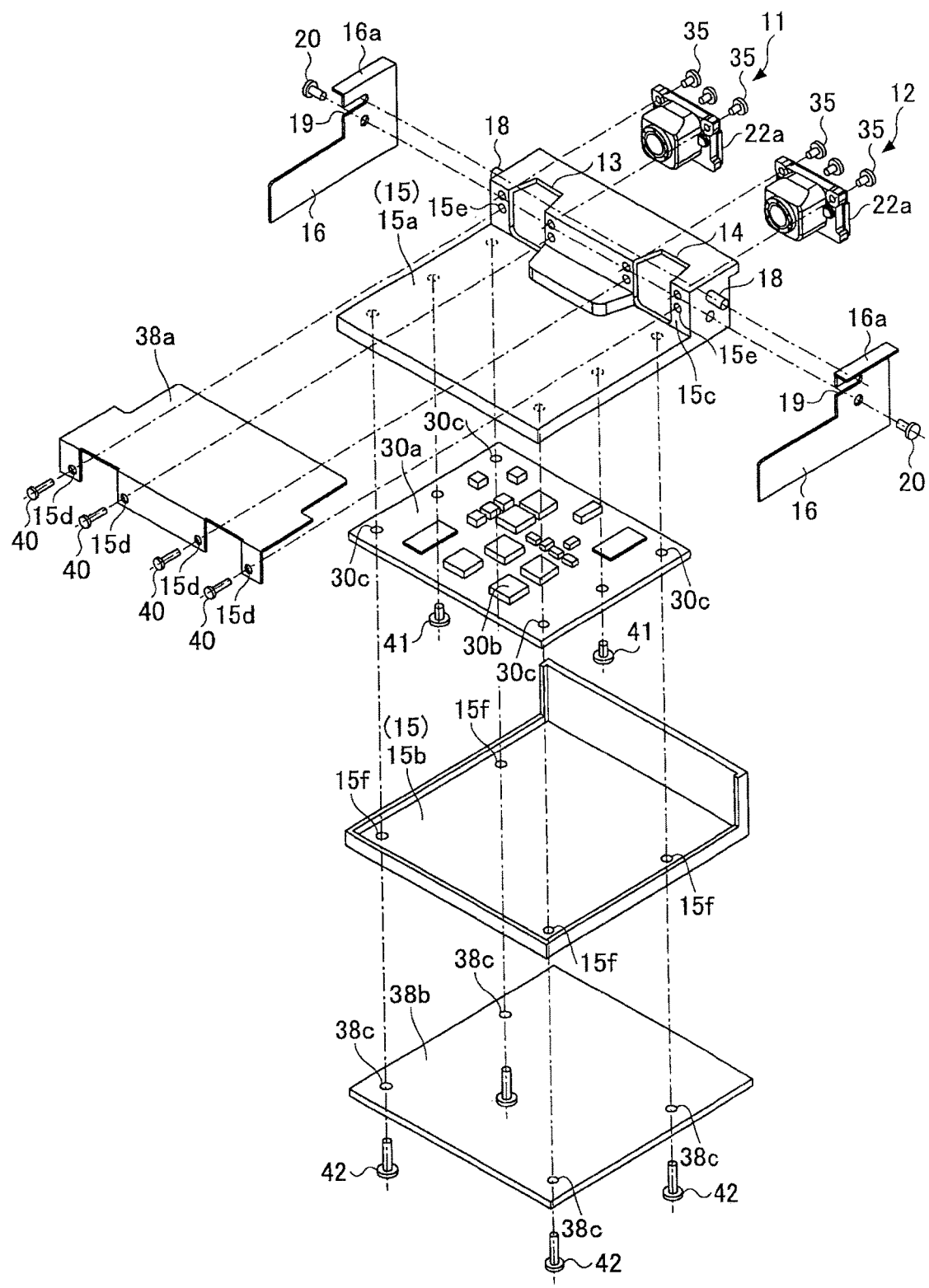
FIG. 2 is an exploded perspective diagram illustrating an example of the imaging unit shown in FIG. 1.

An overall configuration of an imaging unit 1 according to the present embodiment will be explained with reference to the drawings. FIG. 1 is a perspective diagram for explaining an example of the overall configuration of the imaging unit according to the first embodiment. Moreover, FIG. 2 is an exploded perspective diagram of the imaging unit shown in FIG. 1.

The imaging unit 1 includes, as shown in FIG. 1, plural (two in FIG. 1) monocular cameras (imaging devices) 11, 12; a chassis 15 for holding the monocular cameras 11, 12; and a circuit substrate. The imaging unit 1 further includes a heat transfer member provided in contact with the chassis 15 or the circuit substrate. The circuit substrate is housed inside the chassis 15.

The circuit substrate is configured by including respective imaging element substrates 22a of the monocular cameras 11, 12; and an image processing substrate 30a for processing images captured by the monocular cameras 11, 12. On each of the imaging element substrates 22a, an imaging element 22b is mounted (See FIG. 3). On the image processing substrate 30a, electronic components 30b for processing an image are mounted (See FIG. 1).

In the present embodiment, a sheet of a heat transfer member 38a and a sheet of a heat transfer member 38b are arranged on a top surface and on a bottom surface of the chassis 15, respectively. By arranging the heat transfer members 38a, 38b so as to contact the chassis 15, a surface contact with a greater area becomes possible, and thereby heat in the chassis 15 can be transferred effectively to the outside.

The imaging unit 1 further includes an installation member (bracket) 16 in order to attach the imaging unit 1 to an installed member. The installed member is, for example, a front windshield F of a vehicle (See FIG. 5). Flat plate-shaped brackets 16 are installed on left and right side surfaces of the chassis 15.

The brackets 16 are installed by causing convex protruding portions 18 provided on the left and right side surfaces of the chassis 15 to engage concave groove portions 19 provided in the brackets 16, respectively, and by performing position adjustment. Specifically, as shown in FIG. 2, the position adjustment is performed while moving the protruding portion 18 along the groove portion 19. After the position adjustment, the brackets 16 are fixed on the left and right side surfaces of the chassis 15 by screws 20. The bracket 16 includes an attachment portion 16a for attachment to the installed member in order to attach the imaging unit 1 to the front windshield F. The imaging unit 1 is installed in a vehicle by fixing the attachment portions 16a of the brackets 16 to the front windshield F. The attachment portion 16a is fixed to the front windshield F by, for example, joining the attachment portion 16a with a surface of the front windshield F, and bonding with an adhesive agent, a double-stick tape or the like. Moreover, the fixing may be performed by screwing a screw in a screw hole in the front windshield F, and fastening.

Meanwhile, the imaging unit 1 may be installed by fixing the heat transfer member 38a to the front windshield F. The heat transfer member 38a is fixed to the front windshield F by using an adhesive agent, a double-stick tape, a screw or the like, in the same way as above.

The chassis 15 is configured by including a first chassis 15a, and a second chassis 15b attached to the first chassis 15a. The monocular cameras 11, 12 are attached to the first chassis 15a spaced apart by a predetermined distance. Specifically, the monocular camera 11 is attached to one end portion (left side in FIG. 1) of the first chassis 15a, and the monocular camera 12 is attached to the other end portion (right side in FIG. 1).

An image of an imaged object is captured by each of the two monocular cameras 11, 12. The monocular cameras 11, 12 are fixed to the chassis 15 by screws 35 from a back side (In FIG. 2, three screws for one monocular camera).

The monocular cameras 11, 12 are arranged at engagement portions 13, 14 (See FIG. 2) which are provided at respective ends of the first chassis 15a. Positions of the monocular cameras 11, 12 are adjusted, while causing the monocular cameras 11, 12 to engage the engagement portions 13, 14, so that a front surface 15c of the first chassis 15a, which is orthogonal to an imaging direction (light axis), becomes a reference plane. After the positions are adjusted, the monocular cameras 11, 12 are fixed to the first chassis 15a by the screws 35 from the back side. In FIG. 1, x-y plane represents the reference plane and z-axis orthogonal to the reference plane represents a light axis direction.

As described above, the heat transfer members 38a, 38b are arranged on top and bottom surfaces of the chassis 15. In the following, the heat transfer member arranged on the top surface of the chassis 15 (first chassis 15a) will be denoted as the heat transfer member 38a, and the heat transfer member arranged on the bottom surface of the chassis (second chassis 15b) will be denoted as the heat transfer member 38b.

The heat transfer member 38a is arranged so as to contact the chassis 15 (first chassis 15a). That is, the heat transfer member 38a is arranged so as to contact the chassis 15 between the monocular camera 11 and the monocular camera 12 (See hatching section S1 in FIG. 1). By arranging the heat transfer member 38a so as to contact the first chassis 15a, a surface contact a greater area becomes possible, and thereby heat in the first chassis 15a can be transferred effectively to the outside.

Furthermore, upon installing the imaging unit 1 on the front windshield F, the heat transfer member 38a is arranged at a position so as to contact the front windshield F. Specifically, the heat transfer member 38a is formed so that a position in the height direction (y-axis direction in FIG. 1) of a contact surface of the heat transfer member 38a contacting the front windshield F is the same as a position in the height direction (y-axis direction in FIG. 1) of a contact surface of the attachment portion 16a contacting the front windshield F. Therefore, upon fixing the attachment portion 16a of the bracket 16 to the front windshield F, the heat transfer member 38a is arranged at the position where the heat transfer member 38a contacts the front windshield F.

The position of the attachment portion 16a and the position of the heat transfer member 38a in the height direction (y-axis direction in FIG. 1) are the same. By fixing the attachment portion 16a to the front windshield F, the heat transfer member 38a contacts the front windshield F. In this case, a part (contacting portion) of the surface of the heat transfer member 38a has only to contact at least a surface of the front windshield F. However, an area of the part contacting the surface of the front windshield is preferably great so as to increase a rate of heat transferred to the front windshield F.

The heat transfer member 38a is arranged on the first chassis 15a by screws 40 (in FIG. 2, four screws). Specifically, a position of the heat transfer member 38a is adjusted by aligning holes 15d with screw holes 15e (See FIG. 2), and the heat transfer member 38a is fixed by the screws 40 so as to contact the first chassis 15a.

The imaging element substrates 22a are attached to the respective monocular cameras 11, 12. The image processing substrate 30a is fixed to the first chassis 15a by screws (fastening members) 41 (in FIG. 2, two screws). After the image processing substrate 30a is fixed to the first chassis 15a, the second chassis 15b is attached to the first chassis 15a.

The image processing substrate 30a is attached to the first chassis 15a by the screws (fastening members) 41 in a region where the image processing substrate 30a contacts the second chassis 15b. Specifically, positions of holes 15f, 30c and 38c formed in the second chassis 15b, the image processing substrate 30a and the heat transfer member 38b, respectively, are adjusted so that the second chassis 15b, the image processing substrate 30a and the heat transfer member 38b are integrated with each other and fixed to the first chassis 15a. After the positions are adjusted, the second chassis 15b is attached to the first chassis 15a by screws (fastening members) 42 (in FIG. 2, four screws). At this time, the image processing substrate 30a is attached to the first chassis 15a by screws (fastening members) 42 (in FIG. 2, four screws) so as to contact the second chassis 15b in the interior of the chassis 15.

The image processing substrate 30a is provided so as to contact the heat transfer member 38b via the second chassis 15b. The heat transfer member 38b is provided so as to contact the second chassis 15b, and the image processing substrate 30a is provided so as to contact the second chassis 15b in the interior of the chassis 15. By arranging the heat transfer member 38b so as to contact the second chassis 15b, a surface contact with a greater area becomes possible, and thereby heat in the second chassis 15b can be transferred effectively to the outside.

Meanwhile, the region where the heat transfer member 38b contacts the second chassis 15b may be a part of or a whole of the part where the image processing substrate 30a contacts the second chassis 15b (See a part denoted S2 in FIG. 1) on the back side. Or, the region may be greater than the whole of the part where the image processing substrate 30a contacts the second chassis 15b.

In the present embodiment, the imaging unit 1 is attached to a vehicle so that a direction orthogonal to the reference plane (z-axis direction) is a travelling direction of the vehicle. Then, the imaging unit 1 measures a distance to the imaged object in the travelling direction of the vehicle.

In order to recognize the imaged object ahead of the vehicle with high accuracy, quite high accuracy in attachment is required for the imaging unit 1. Since the imaging unit 1 generates a distance image from parallax in a pair of captured images captured by the monocular cameras 11, 12, deviation of the imaging direction (light axis) directly influences a calculated distance.

However, an inclination angle of the front windshield F varies depending on a type of vehicle. Moreover, the imaging direction of a vehicle-mounted camera actually varies due to a distortion of a vehicle body, a limit of accuracy in attaching the camera or the like. Therefore, preparing plural kinds of brackets having different shapes, attachment positions or the like is desirable. Then, it becomes possible to provide imaging units 1 having heat transfer structures corresponding to various types of vehicles. Only by preparing plural kinds of brackets 16, it becomes possible to install an imaging unit 1, in which a deviation of the light axis falls within a proper range for each type of vehicle.

In the above-described embodiment, the example in which two monocular cameras 11, 12 are installed in the imaging unit 1 is explained. However, the present invention is not limited to the above configuration. Three or more cameras may be installed in the imaging unit 1. In the following, the case where two monocular cameras 11, 12 are installed in the imaging unit 1 will be explained.

Moreover, in the present embodiment, the example in which the brackets 16 are separately attached to the left and right side surfaces of the chassis 15, respectively, is explained. However, the present invention is not limited to this configuration. For example, the bracket may be formed integratedly into a U-shape so as to cover a top surface, a left surface and a right surface of the imaging unit.

<Configuration of Imaging Device 11>

Figure 3:
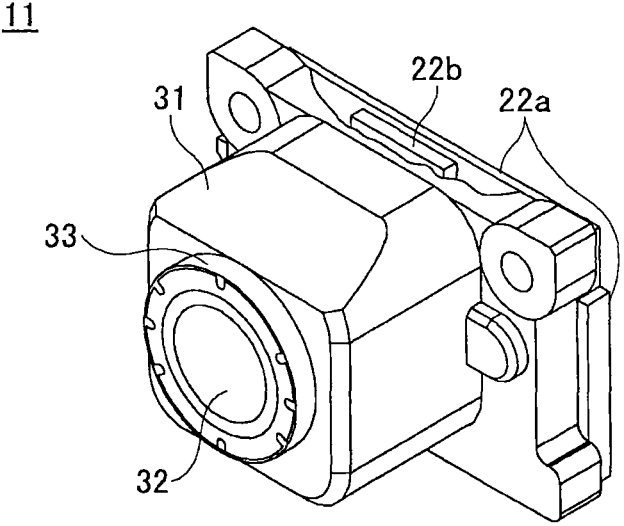
FIG. 3 is a perspective diagram for explaining an example of an overall configuration of a camera provided in the imaging unit shown in FIG. 1.

Next, an overall configuration of the monocular camera (imaging device) provided in the imaging unit 1 will be explained with reference to the drawings. FIG. 3 is a perspective diagram for explaining an example of the overall configuration of the camera 11 provided in the imaging unit shown in FIG. 1.

The monocular camera 11 provided in the imaging unit 1 is configured by including a holder 31, a lens 32 provided on a front side of the holder 31, and a lens fixing member (lens cell) 33 for holding the lens 32. The monocular camera 11 is provided with the imaging element substrate 22a, and the imaging element 22b is mounted on the imaging element substrate 22a. Meanwhile, in the present embodiment, the front side represents a side of the imaged object. A configuration of the monocular camera 12 is essentially the same as that of the monocular camera 11.

The imaging element 22b detects light in a light image (or, simply, an image) formed by the lens 32 from light received from the imaged object, and generates an electric signal based on the detected light. The electric signals are processed by the electronic components 30b on the image processing substrate 30a and data (image data) based on the electric signals are generated (The detected light is converted into an electric signal). The monocular camera 11 or 12 captures an image of the imaged object, and the imaging element 22b and the electronic components 30b generate image data based on the captured image. The data generated by the imaging element 22b and the electronic components 30b based on the light from the imaged object will be called "image data" or simply an "image" in the following.

The imaging element 22b is not limited to a CCD (Charge Coupled Device), but may be a CMOS (Complementary Metal Oxide Semiconductor) or the like. In the imaging unit 1, the two monocular cameras 11, 12 are arranged at a distance of a predetermined base-line length so that light axes are parallel to each other.

The imaging unit 1 provided with the two monocular cameras 11, 12, in this way, can measure a distance to the imaged object by using parallax between left and right monocular cameras 11, 12 (base-line length).

<Heat Transfer Structure of the Imaging Unit 1>

Figure 4:
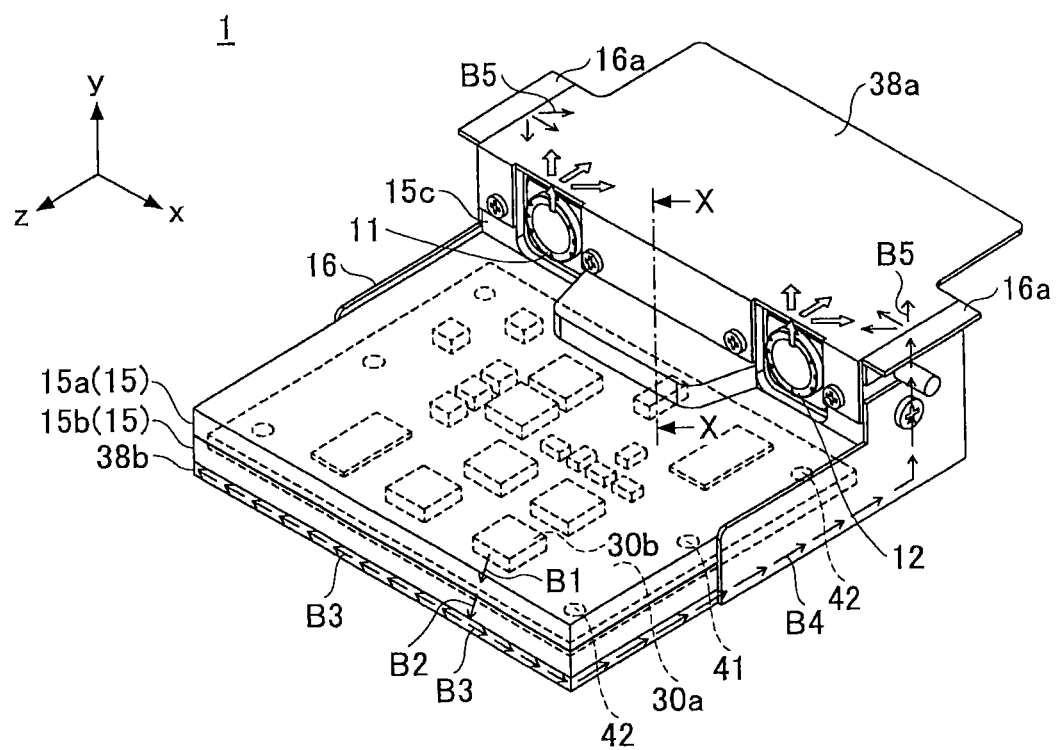
FIG. 4 is a diagram illustrating an example of a heat transfer structure of the imaging unit shown in FIG. 1.

Next, a heat transfer structure of the imaging unit 1 will be explained with reference to the drawings. FIG. 4 is a diagram illustrating an example of the heat transfer structure of the imaging unit 1 shown in FIG. 1.

As described above, the chassis 15 includes the imaging element substrate 22a and the image processing substrate 30a (circuit substrate). On the imaging element substrates 22a and the image processing substrate 30a, the imaging elements 22b and the electronic components 30b are mounted, respectively.

<Heat Transfer Structure of Imaging Element 22b>

Figure 5:
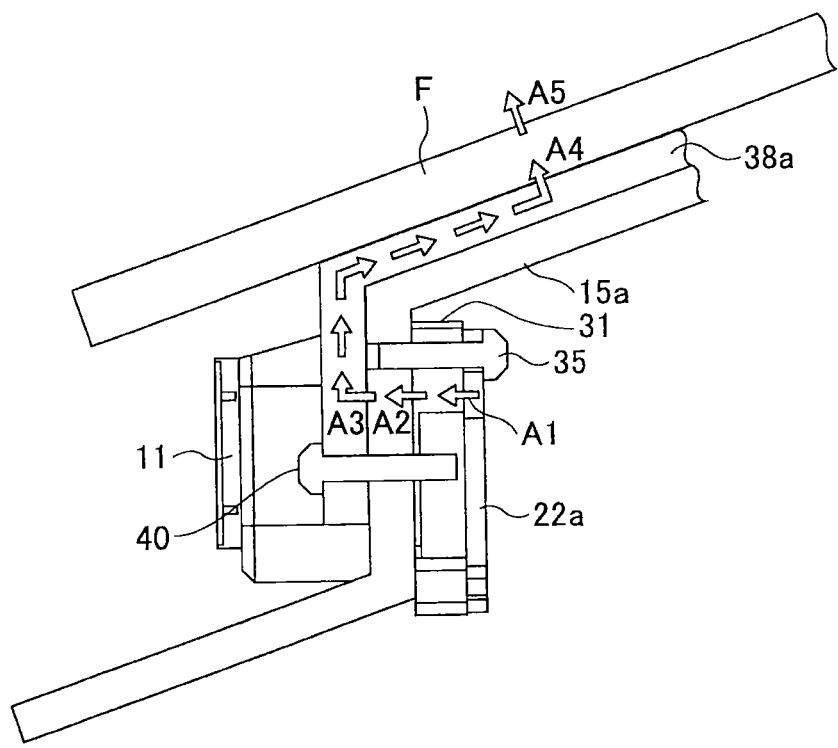
FIG. 5 is a cross-sectional diagram for explaining an example of the heat transfer structure of the imaging unit shown in FIG. 1, and illustrates a cross-section cut along a line X-X in FIG. 4 for explaining a heat transfer structure of an imaging element.

At first, a heat transfer structure of the imaging element 22b mounted on the imaging element substrate 22a will be explained. FIG. 5 is a cross-sectional diagram for explaining an example of the heat transfer structure of the imaging unit 1 shown in FIG. 1, and is a cross-sectional diagram cut along a line X-X in FIG. 4 for explaining a heat transfer structure of the imaging element.

After a position of the imaging element substrate 22a with respect to the holder 31 is adjusted, the imaging element substrate 22a is fixed so as to contact a back side of the holder 31 of the monocular cameras 11, 12 by a screw 35 (See FIG. 5). In the state where the imaging element substrate 22a is fixed to the monocular cameras 11, 12, the monocular cameras 11, 12 are arranged at the engagement portions 13, 14 (See FIG. 2) provided on respective ends of the chassis 15. Then, the holders 31 of the monocular cameras 11, 12 contact the chassis 15 (first chassis 15a). Furthermore, the heat transfer member 38a is fixed to the first chassis 15a by a screw 40 (See FIG. 5). That is, the heat transfer member 38 (38a) is arranged so as to contact the chassis 15 (first chassis 15a).

The heat transfer member 38a is arranged at a position, at which the heat transfer member 38a contacts the front windshield F, in the case where the imaging unit 1 is installed on the front windshield F. That is, when the imaging unit 1 is installed on the front windshield F, the heat transfer member 38a contacts the front windshield F.

According to the above-described configuration, as shown in FIG. 4, heat of the imaging element 22b, which is a heat source, is transferred to the imaging element substrate 22a, conducted through the holders 31 of the monocular cameras 11, 12, transferred to the heat transfer member 38a from the first chassis 15a, and transferred to the outside (See void arrows in FIG. 4).

To explain more in detail, the heat of the imaging element 22b is transferred to the holder 31 via the imaging element substrate 22a (See arrow A1 in FIG. 5). Then, the heat transferred to the holder 31 is transferred to the first chassis 15a, which contacts the holder 31 (See arrow A2 in FIG. 5). Next, the heat transferred to the first chassis 15a is transferred to the heat transfer member 38a which is fixed so as to contact the first chassis 15a (See arrow A3 in FIG. 5). Moreover, the imaging unit 1 is installed on the front windshield F so that the heat transfer member 38a contacts the front windshield F. Then, heat inside the chassis 15, which becomes a high temperature due to heat generation of the imaging element 22b, is transferred to the outside of the vehicle (See arrow A5 in FIG. 5) via the front windshield F (See arrow A4 in FIG. 5).

The imaging element substrate 22a is preferably made of a material excellent in heat conductivity or heat dissipation (for example, thick copper).

Accordingly, the heat inside the chassis 15 can be transferred effectively from the inside of the chassis 15 having small heat capacity to the outside of the chassis 15 having great heat capacity.

<Heat Transfer Structure of Electronic Component 30b>

Next, a heat transfer structure of the electronic components 30b mounted on the image processing substrate 30a will be explained.

As described above, the image processing substrate 30a is provided so as to contact the heat transfer member 38b via the second chassis 15b. Specifically, the image processing substrate 30a is fixed to the first chassis 15a by the screws 41. After the image processing substrate 30a is fixed, the heat transfer member 38b is fixed so as to contact the second chassis 15b by the screws 42 while attaching the second chassis 15b to the first chassis 15a. Then, the image processing substrate 30a contacts the second chassis 15b inside the second chassis 15b, and the heat transfer member 38b contacts a surface of the second chassis 15b. The brackets 16 are attached on the left and right sides of the first chassis 15a and of the second chassis 15b so as to contact the heat transfer member 38b.

According to the above-described configuration, as shown in FIG. 4, heat of the electronic components 30b, which is a heat source, is transferred to the image processing substrate 30a, transferred through the heat transfer member 38b from the second chassis 15b, transferred to the heat transfer member 38a via the bracket 16, and transferred to the outside of the vehicle (See arrows).

To explain more in detail, the heat of the electronic components 30b is transferred to the image processing substrate 30a (See arrow B1 in FIG. 4). Then, the heat transferred to the image processing substrate 30a is transferred to the second chassis 15b (See arrow B2 in FIG. 4). Next, the heat transferred to the second chassis 15b is transferred to the heat transfer member 38b, which contacts the second chassis 15b (See arrow B3 in FIG. 4). Then, the heat transferred to the heat transfer member 38b is transferred to the bracket 16 (See arrow B4 in FIG. 4). Next, the heat transferred to the bracket 16 is transferred to the heat transfer member 38a (See arrow B5 in FIG. 5). Then, the heat transferred to the heat transfer member 38a is transferred through the front windshield F, thereby the heat inside the chassis 15, which becomes a high temperature due to heat generation of the electronic component 30b, is transferred to the outside of the vehicle.

In this way, the heat inside the chassis 15 can be transferred effectively from the inside of the chassis 15 having small heat capacity to the outside of the chassis 15 having great heat capacity.

Furthermore, the heat generated by the imaging elements 22b and the electronic components 30b is transferred to the heat transfer members 38a, 38b through the respective substrates 22a, 30a, and thereby the heat transferred to the heat transfer members 38a, 38b is transferred to the outside of the vehicle by itself.

Here, the heat transfer members 38a, 38b are preferably made of a material with heat conductivity greater than that of the chassis 15, since heat is easily transferred. The material of the heat transfer members 38a, 38b is not especially limited as long as it is excellent in heat conductivity compared with the chassis 15. For example, aluminum, copper or the like is desirable according to its excellent heat conductivity.

Since the heat transfer members 38a, 38b have greater heat conductivity than the heat transfer conductivity of the chassis 15, heat of the chassis 15 is transferred to the heat transfer members 38a, 38b, and the rise in temperature can be prevented. In the present embodiment, since the heat transfer member 38a is installed around the monocular cameras 11, 12, deviation in the positional relationship between the monocular cameras due to the rise in temperature can be suppressed. When the distance between the monocular cameras 11, 12 (x-axis direction, y-axis direction or z-axis direction in FIG. 1) increases due to thermal expansion of the chassis 15, the accuracy in the distance calculation may be degraded. However, in the present embodiment, such degradation can be prevented. Moreover, a lens optical system of each of the monocular cameras 11, 12 is heat-sensitive. However, in the present embodiment, degradation of optical performance of the lens optical system due to the rise in temperature can be prevented.

Meanwhile, for fastening of the chassis 15 or the screws (fastening surface, screw hole or the like) heat conducting grease or gel is preferably applied. According to the application, thermal resistance of the members can be decreased, the rise in temperature can be suppressed, and the thermal conductivity of the chassis 15 can be enhanced.

Meanwhile, in the above-described embodiment, the example in which the installed member is a front windshield F is explained. However, the present invention is not limited to the above configuration. For example, the imaging unit 1 may be installed on a frame of the vehicle (not shown) instead of the front windshield F. In this case, the heat transferred to the heat transfer member 38a from the imaging element 22b or the electronic component 30b is transferred to the frame of the vehicle. The imaging unit 1 is installed by fixing to the frame of the vehicle by an adhesive agent, a double-stick tape, screws or the like.

[Second Embodiment]

Figure 6A:
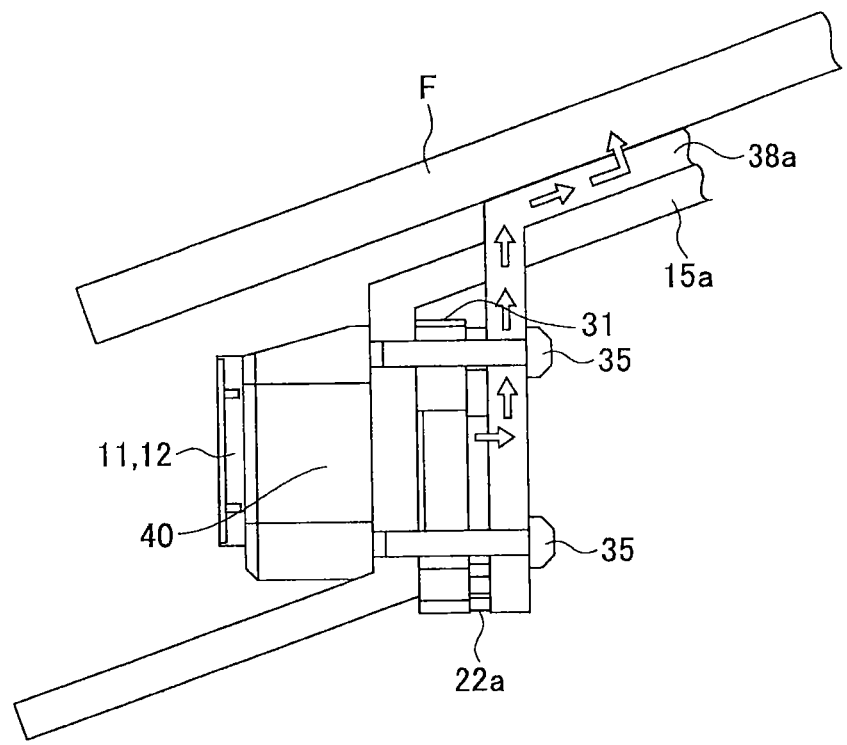
FIG. 6A is a cross-sectional diagram illustrating an example of an imaging unit according to a second embodiment, and illustrates an internal structure near an imaging element substrate.
Figure 6B:
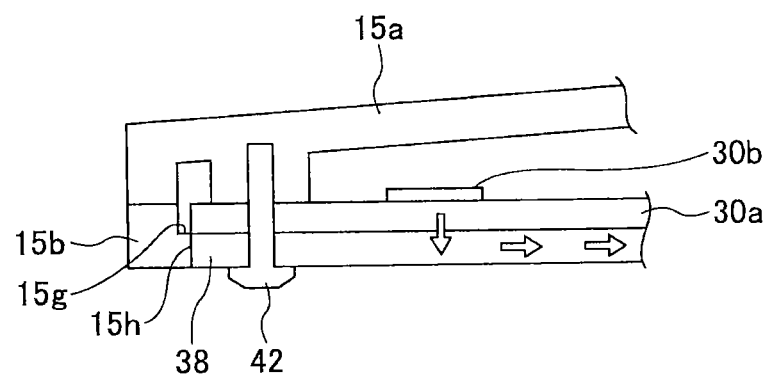
FIG. 6B is a cross-sectional diagram illustrating an example of the imaging unit according to the second embodiment, and illustrates an internal structure near an image processing substrate.

In the first embodiment, the example in which the heat transfer members 38a, 38b are installed so as to contact the imaging element substrate 22a and the image processing substrate 30a via a separated member, such as the holder 31 or the chassis 15, is explained. However, the present invention is not limited to the above configuration. For example, the imaging element substrate 22a and the image processing substrate 30a may directly contact the heat transfer members 38a, 38b. FIGS. 6A and 6B are cross-sectional diagrams of the imaging unit according to a second embodiment. FIG. 6A illustrates an internal structure near the imaging element substrate. FIG. 6B illustrates an internal structure near the image processing substrate. Void arrows represent directions of heat transfers, respectively.

As shown in FIG. 6A, the heat transfer member 38a may be installed so as to directly contact the imaging element substrate 22a. For example, a position of the imaging element substrate 22a with respect to the holder 31 is adjusted. In a state where the position is adjusted, the monocular cameras 11, 12 are arranged at the engagement portions 13, 14 (See FIG. 2) provided at respective ends of the chassis 15 (first chassis 15a). Afterwards, holes of the imaging element substrate 22a and holes of the heat transfer member 38a are aligned, and the monocular cameras 11, 12 are fixed to the first chassis 15a while fixing the imaging element substrate 22a and the heat transfer member 38a on the back side of the holder 31 by the screws 35. A part of the heat transfer member 38a protrudes from the first chassis 15a. In the case of installing the imaging unit 1 on the front windshield F, the imaging unit 1 is attached so that the protruding portion contacts the front windshield F. Then, the heat of the imaging element substrate 22a is directly transferred to the heat transfer member 38a without being transferred through the holder 31 or the chassis 15, and thereby the heat is transferred efficiently.

Moreover, as shown in FIG. 6B, the heat transfer member 38b may be installed so as to directly contact the image processing substrate 30. For example, a window portion 15h is provided in a surface 15g of the second chassis 15b, which the image processing substrate 30a contacts, and the heat transfer member 38b is arranged at the window portion 15h. The heat transfer member 38b and the image processing substrate 30a are fixed to the first chassis 15a by the screw 42. The heat of the image processing substrate 30a is directly transferred to the heat transfer member 38b without being transferred through the chassis 15, and thereby the heat is transferred efficiently.

[Third Embodiment]

Figure 7:
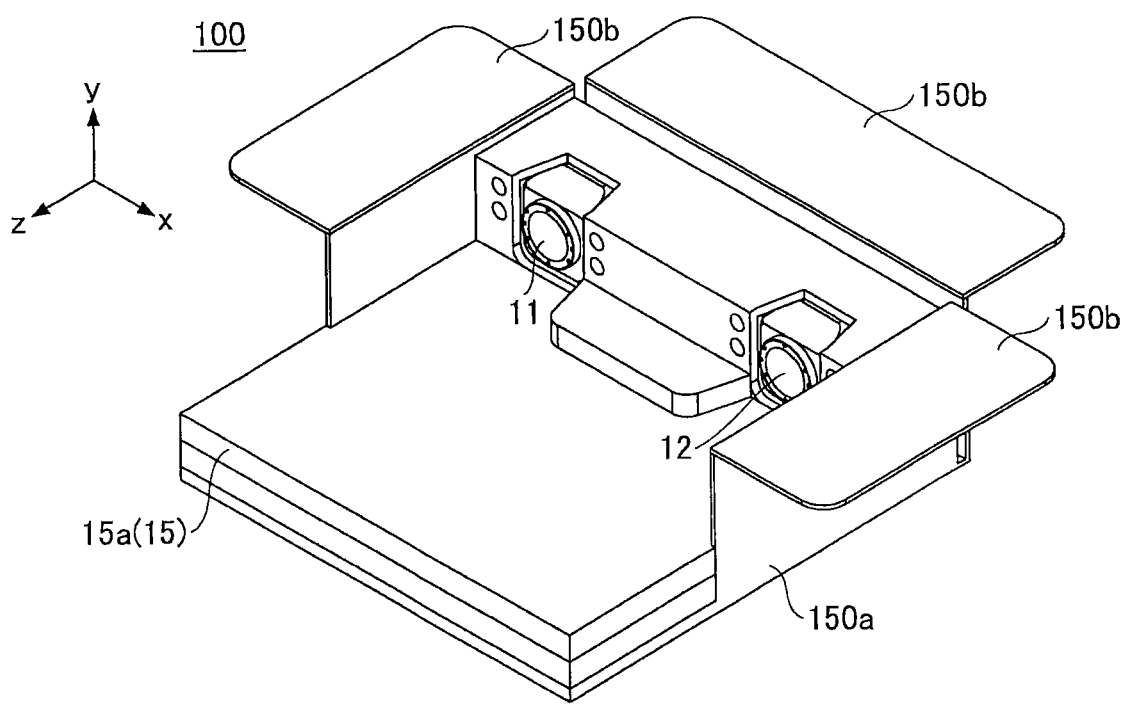
FIG. 7 is a perspective diagram for explaining an example of an overall configuration of an imaging unit according to a third embodiment.

In the first embodiment, the example in which the bracket 16 and the heat transfer members 38a, 38b are configured as separated members is explained. However, the present invention is not limited to the above configuration. For example, as shown in FIG. 7, it may be configured as a cover 150a, in which the heat transfer member 38b and the bracket are integrally formed by using the heat transfer member 38b as the bracket. In this case, the heat transfer member 38b can also be used as the heat transfer member 38a. An imaging unit 100 is installed by fixing the attachment portion 150b to the front windshield F by using an adhesive agent, a double-stick tape, a screw or the like. According to the above-described configuration, a number of components can be reduced, and thereby the imaging unit 100, which is low in cost and can prevent rise in temperature, is provided.

In this case, the heat of the imaging element 22b is transferred in the order of the imaging element substrate 22a, the holder 31, the first chassis 15a, the cover 150a (attachment portion 150b) and the front windshield F. Moreover, the heat of the electronic component 30b is transferred in the order of the image processing substrate 30a, the second chassis 15b, the cover 150a (attachment portion 150b) and the front windshield F.

A material of the cover 150a is not especially limited as long as it has heat conductivity, stiffness and workability. As a material having heat conductivity, stiffness and workability, aluminum is preferable. However, the material is not limited as long as the material has characteristic equivalent to aluminum (great heat conductivity, small linear expansion coefficient or the like).

Moreover, it may be configured so that the first chassis or the second chassis and the bracket are formed integrally while using the heat transfer member 38b as the bracket. Then, the number of components can be further reduced, and thereby cost reduction can be realized. Moreover, since the first chassis or the second chassis and the bracket are formed integrally, the need to adjust the position of the bracket is eliminated, and thereby it is excellent in assembling performance. Furthermore, since complicated machining such as a protruding portion or a groove portion in the chassis or the bracket is not required, manufacturing labor-hours can be reduced.

Since the imaging unit according to any one of the first to third embodiments has the above-described heat transfer structure, the heat generated by the imaging element 22b or the electronic components 30b can be transferred to the outside of the vehicle efficiently with a simple configuration.

Moreover, in the respective above-described embodiments, the example where the imaging element substrate 22a, the imaging element 22b, the image processing substrate 30a, the electronic component 30b and the heat transfer members are attached to the chassis 15 by a screw is explained. However, the present invention is not limited to this configuration. The method of fixing is not especially limited as long as the above members can be fixed to the chassis 15, respectively.

[Fourth Embodiment]

In the above-described first to third embodiments, the case where the imaging unit is applied for on-vehicle use is explained. However, the present invention is not limited to this configuration. For example, the imaging unit may be applied to an FA (Factory Automation), and may be used for calculating a distance to an imaged object to be picked upon picking a product or the like which is conveyed in a production plant.

<Configuration in the Case of Applying Imaging Unit 1, 100 to FA>

Figure 8:
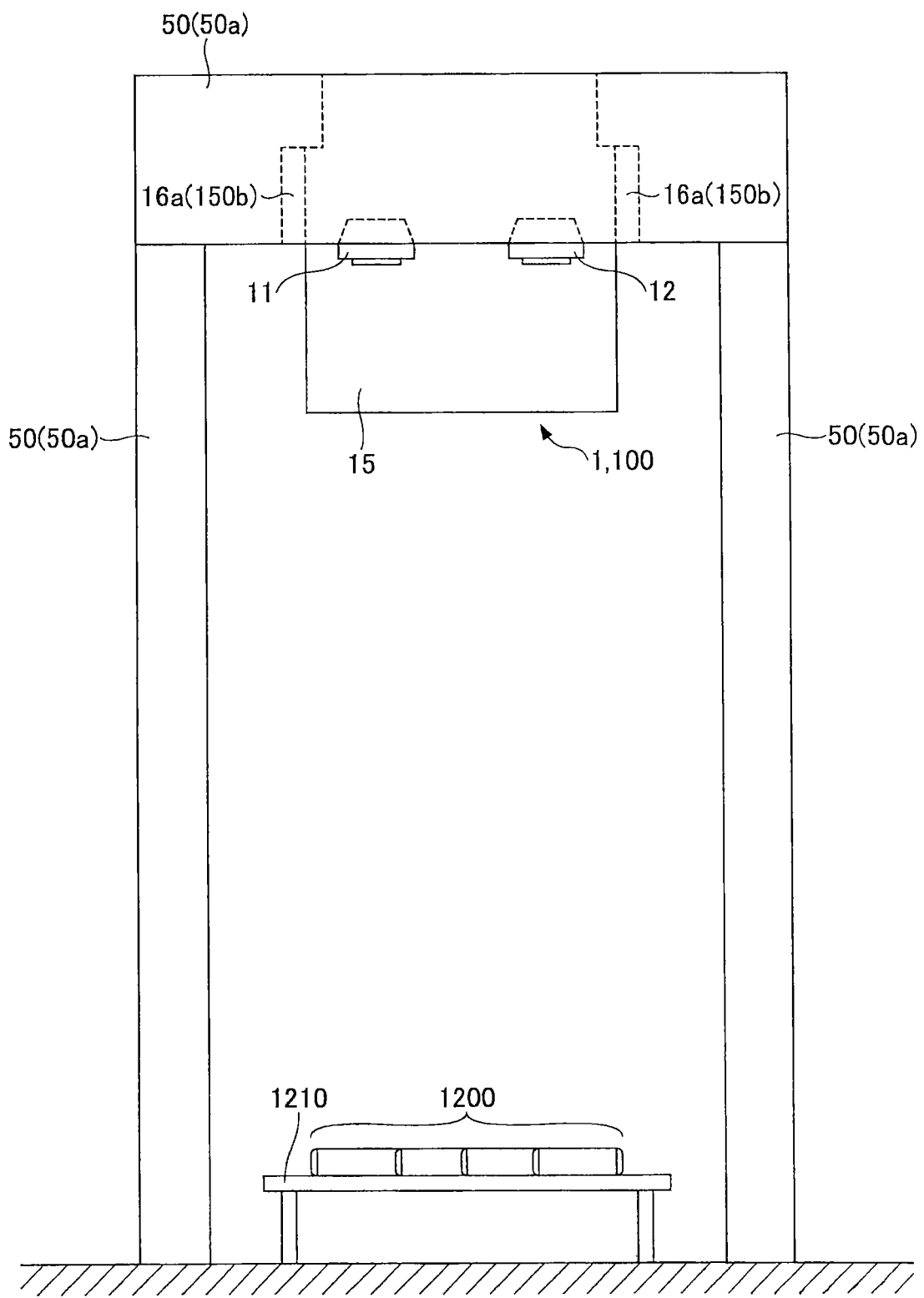
FIG. 8 is a diagram for explaining an example of an overall configuration of the imaging unit in the case of applying the imaging unit shown in FIG. 1 or FIG. 7 to FA (Factory Automation)

FIG. 8 is a diagram for explaining an example of an overall configuration of the imaging unit in the case of applying the imaging unit shown in FIG. 1 and FIG. 7 to FA (Factory Automation).

As shown in FIG. 8, the imaging unit 1, 100 includes monocular cameras 11, 12 on the left and right. A product (for example, iron product) 1200 is arranged on a table 1210. The monocular cameras 11, 12 are arranged at a position from which the product 1200 arranged on the table 1210 can be imaged.

In the case of applying the imaging unit 1, 100 to the FA, the imaging unit 1, 100 is fixed on a holding frame (installed member) 50. The height of an attachment surface of the holding frame 50 on which the imaging unit 1, 100 is installed is adjusted to the position from which the product 1200 arranged on the table 1210 can be imaged. The holding frame 50 is formed by combining plural metallic plate members 50a. The imaging unit 1, 100 is installed on the holding frame 50 by fixing the attachment portion 16a of the bracket 16 (or the attachment portion 150b of the cover 150a) to the plate members 50a by using a screw, a fixture, an adhesive agent, a double-stick tape or the like.

In this case, the heat transferred from the imaging element 22b or the electronic component 30b to the heat transfer member 38a (or the cover 150a, the attachment portion 150b) is transferred to the holding frame 50, and transferred to the atmosphere.

A material of the holding frame 50 is not especially limited as long as it has heat conductivity, stiffness and workability. As a material having heat conductivity, stiffness and workability, aluminum is preferable. However, the material is not limited as long as the material has characteristic equivalent to aluminum (great heat conductivity, small linear expansion coefficient or the like).

In this way, also in the case of applying the imaging unit 1, 100 to FA, the heat inside the chassis 15 can be transferred effectively from the inside of the chassis 15 having small heat capacity to the outside of the chassis 15 having great heat capacity.

[Fifth Embodiment]

In the above-described embodiments, the example where the heat transfer members are arranged outside the chassis 15 is explained, but the heat transfer members may be arranged inside the chassis 15. Moreover, by applying a surface treatment for radiation to the respective surfaces of the chassis 15, a rise in temperature inside the chassis 15 can be prevented.

<Configuration of Imaging Unit 200>

Figure 9:
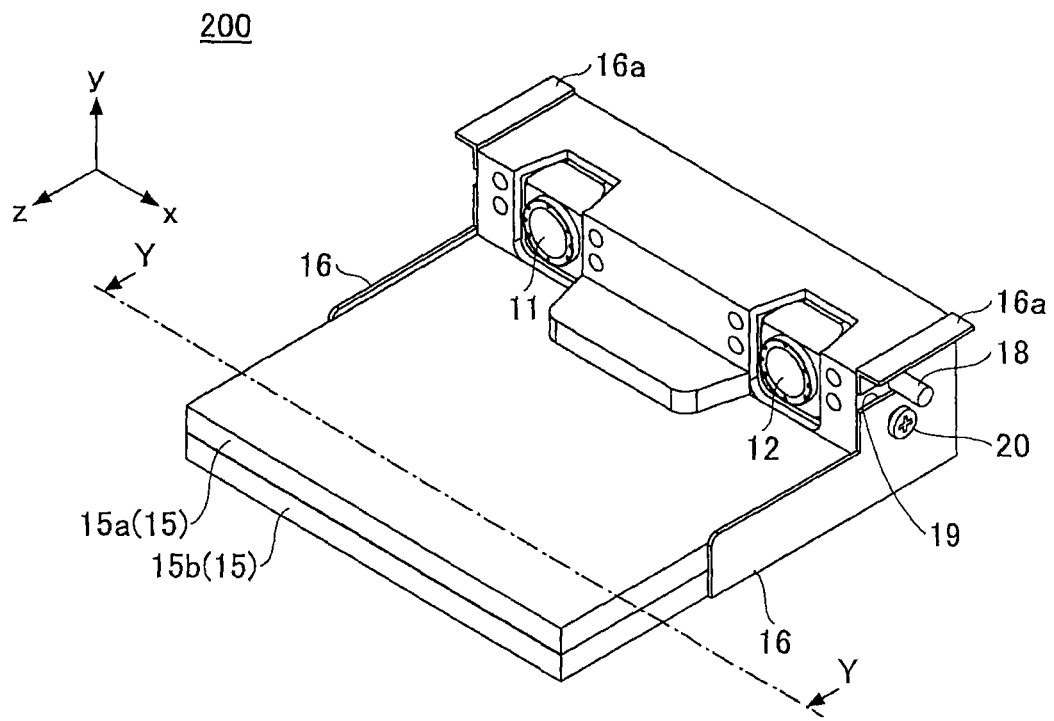
FIG. 9 is a perspective diagram for explaining an example of an overall configuration of an imaging unit according to a fifth embodiment.
Figure 10:
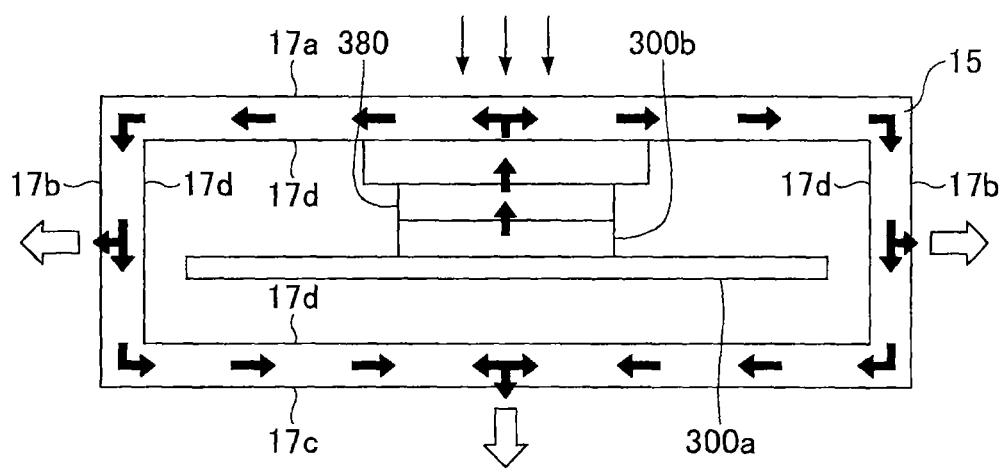
FIG. 10 is a cross-sectional diagram cut along a line Y-Y in FIG. 9, and schematically illustrates an example of an internal structure of the imaging unit.

A schematic configuration of an imaging unit 200 according to a fifth embodiment will be explained with reference to the drawings. FIG. 9 is a perspective diagram for explaining an overall configuration of the imaging unit according to the fifth embodiment. Moreover, FIG. 10 is a cross-sectional diagram cut along a line Y-Y in FIG. 9, and is a schematic diagram for explaining an internal structure of the imaging unit.

The imaging unit 200 includes, as shown in FIG. 9, plural (two in FIG. 1) monocular cameras (imaging devices) 11, 12; a chassis 15 for holding the monocular cameras 11, 12; and a circuit substrate. The imaging unit 200 further includes a heat transfer member provided in contact with the chassis 15 or the circuit substrate. The circuit substrate is housed inside the chassis 15. An installed member is, for example, a front windshield F of a vehicle.

The chassis 15 is configured by including a first chassis 15a, and a second chassis 15b attached to the first chassis 15a. The monocular cameras 11, 12 are attached to the first chassis 15a spaced apart by a predetermined distance. Inside the chassis 15, an internal component such as the circuit substrate is housed, and the circuit substrate is provided as an intermediate member in contact with the chassis 15 via a heat transfer member 380. In FIG. 10, the circuit substrate is an image processing substrate 300a which processes images captured by the monocular cameras 11, 12.

Specifically, an electronic component 300b for image processing is mounted in the image processing substrate 300a. The electronic component 300b contacts the heat transfer member 380, which is provided so as to contact the chassis 15. The heat transfer member 380 is arranged on a top surface of the electronic component 300b, and attached so as to contact an inner surface 17d of the first chassis 15a. Then, the heat transfer member 380 is provided so as to be held between the top surface of the electronic component 300b and the inner surface 17d of the chassis 15 (the first chassis 15a). The heat transfer member 380 is attached onto the top surface of the electronic component 300b by applying heat conducting grease or gel or the like, for example. The attachment via heat conducting grease or gel is preferable since heat conductivity of the heat transfer member 380 can be improved.

In the present embodiment, the example where the heat transfer member 380 is formed so that a cross-sectional area of the heat transfer member 380 is almost the same as a cross-sectional area of the electronic component 300b is explained. However, the present invention is not limited to this configuration. The cross-sectional area of the heat transfer member 380 may be less than the cross-sectional area of the electronic component 300b. However, the greater a surface area (the cross-sectional area) of the heat transfer member 380, the more preferable, since a heat transfer rate increases and a heat transfer effect is improved.

Other configurations of the imaging unit 200 according to the present embodiment are essentially the same as those in the imaging unit 1.

Moreover, the imaging unit 200 is arranged so that in a state of being installed on a front windshield F of a vehicle, a surface of the imaging unit 200 opposing the front windshield F (top surface 17a in FIG. 9) is a light receiving surface of sunlight. Meanwhile, the installation of the imaging unit 200 onto the front windshield F is not especially limited, as long as the top surface of the chassis 15 (the first chassis 15a) is directed to outside the vehicle and the bottom surface of the chassis 15 (the second chassis 15b) is directed to inside the vehicle. For example, the imaging unit 200 may be installed near the front windshield F (for example, around a rear-view mirror. Or, the imaging unit 200 may be installed so that the top surface of the chassis 15 (the first chassis 15a) contacts the side of the front windshield F.

<Heat Transfer Structure of Imaging Unit 200>

A heat transfer structure of the imaging unit 200 according to the present embodiment will be explained with reference to FIG. 10. Meanwhile, in FIG. 10, thin arrows represent a direction of sunlight, thick arrows represent directions of transfer of heat, and void arrows represent directions of heat radiation.

Respective surfaces of the chassis 15 of the imaging unit 200 are subjected to surface treatment. The surface treatment applied to the respective surfaces of the chassis 15 will be explained with reference to FIG. 10.

A side surface 17b and a bottom surface 17c of the chassis 15 are subjected to surface treatment for high radiation. According to the surface treatment, the imaging unit 200 performs radiation efficiently. The surface treatment for high radiation is performed by, for example, alumite treatment. The side surface 17b and the bottom surface 17c of the chassis 15 may be formed of a high radiation material, or high radiation paint may be applied on the side surface 17b and the bottom surface 17c.

The inner surface 17d of the chassis 15 is subjected to surface treatment for low radiation. The surface treatment for low radiation is performed by, for example, polishing a foundation of a metallic material. Low radiation paint may be applied on the inner surface 17d of the chassis 15. Meanwhile, the top surface 17a of the chassis 15 is also subjected to the surface treatment for low radiation. The top surface of the chassis 15 may be subjected to surface treatment with low solar radiation transmissivity.

That is, in a state of being installed on a front windshield F of a vehicle, a surface opposing the front windshield F (top surface 17a) is subjected to surface treatment so as to lower solar light absorptance. Then, surfaces other than the surface opposing the front windshield F, i.e. the side surface 17*b* and the bottom surface 17*c* are subjected to heat treatment so as to increase a radiation rate.

The surface treatment for high radiation applied to the side surface 17*b* and the bottom surface 17*c* of the chassis 15 is intended to increase the transfer of heat, previously transferred from the electronic component 300*b* via the heat transfer member 380, from the sides of the side surface 17*b* and the bottom surface 17*c* of the chassis 15.

Moreover, the surface treatment for low radiation applied to the inner surface of the chassis 15 is intended to prevent the heat, transferred from the electronic component 300*b* via the heat transfer member 380, from being transferred toward the interior of the chassis 15.

Furthermore, in the present embodiment, since the top surface 17*a* of the chassis 15 is subjected to the low radiation treatment, heat transfer to the chassis 15 by solar radiation (See thin arrows in FIG. 10) can be reduced. In order to suppress the heat transfer by solar radiation, the top surface 17*a* of the chassis 15 is preferably subjected to surface treatment with low solar light absorptance. For example, a white paint is preferably applied to the top surface 17*a* of the chassis 15. The radiation rate, as well as the solar light absorptance, can be lowered.

According to the above-described configuration of the imaging unit 200, heat generated by the electronic component 300*b* is transferred, at first, to the heat transfer member 380. Then, the heat transferred to the heat transfer member 380 is transferred from the inner surface 17*d* of the chassis 15, which is subjected to the surface treatment for low radiation, to the side surface 17*b* and the bottom surface 17*c* of the chassis 15, which are subjected to the surface treatment for high radiation (See thick arrows in FIG. 10). According to the above-described configuration, the heat generated by the electronic component 300*b* is transferred to the outside of the chassis 15 (See void arrows in FIG. 10).

At this time, since the inner surface 17*d* of the chassis 15 is subjected to the surface treatment for low radiation, the heat transferred from the heat transfer member 380 to the chassis 15 is not transferred toward the interior of the chassis 15. Therefore, heat accumulation inside the chassis 15 is suppressed, and a sudden increase in temperature around the electronic component 300*b* is prevented. Furthermore, since the top surface 17*a* of the chassis 15 is also subjected to the surface treatment for low radiation, the heat transfer to the chassis 15 by solar radiation (See thin arrows in FIG. 10) can be reduced, and the increase in temperature around the electronic component 300*b* is further suppressed.

In this way, in the imaging unit 200 according to the present embodiment, the heat inside the chassis 15 can be transferred effectively from the inside of the chassis 15 having small heat capacity to the outside of the chassis 15 having great heat capacity.

<Summary>

Each of the imaging units according to the first to fourth embodiments is provided with the heat transfer members 38*a*, 38*b*.

To explain in more detail, the heat transfer member 38*a* is provided so as to contact the first chassis 15*a*. Specifically, the heat transfer member 38*a* is provided so as to contact the chassis 15 between the monocular camera 11 and the monocular camera 12 (See hatching section S1 in FIG. 1). Since the heat transfer member 38*a* contacts the first chassis 15*a*, a surface contact with a greater area becomes possible, and thereby heat in the first chassis 15*a* can be transferred effectively to the outside.

The heat transfer member 38*b* is provided so as to contact the second chassis 15*b*. Meanwhile, the region where the heat transfer member 38*b* contacts the second chassis 15*b* may be a part of or a whole of the part where the image processing substrate 30*a* contacts the second chassis 15*b* (See a part denoted S2 in FIG. 1) on the back side. Or, the region may be greater than the whole of the part where the image processing substrate 30*a* contacts the second chassis 15*b*.

Moreover, the imaging element substrate 22*a* and the image processing substrate 30*a* may be provided so as to contact the heat transfer members 38*a*, 38*b* via a separated member such as the chassis 15. Since the heat transfer members 38*a*, 38*b* contact the chassis 15, a surface contact with a greater area becomes possible, and thereby heat in the chassis 15 can be transferred effectively to the outside.

Meanwhile, as shown in FIGS. 6A and 6B, the imaging unit may be configured so that the imaging element substrate 22*a* and the image processing substrate 30*a* contact directly the heat transfer members 38*a*, 38*b*. The heat of the imaging element substrate 22*a* and the image processing substrate 30*a* is directly transferred to the heat transfer members 38*a*, 38*b* without being transferred through a separated member, such as the chassis 15, and thereby the heat is transferred efficiently.

According to the first to fourth embodiments, in a state where the imaging unit 200 is installed on the front windshield F (installed member), the heat transfer members 38*a*, 38*b* are arranged so as to contact the front windshield F.

Each of the imaging units according to the first, third and fourth embodiments is provided with a first heat transfer path in which heat is transferred in an order of the imaging element 22*b*, the imaging element substrate 22*a*, the holder 31, the chassis 15 (first chassis 15*a*), the heat transfer member 38*a* (or the cover 150*a*) and the front windshield F (or the holding frame). Moreover, each of the imaging units according to the first, third and fourth embodiments is provided with a second heat transfer path in which heat is transferred in an order of the electronic component 30*b*, the image processing substrate 30*a*, the chassis 15 (second chassis 15*b*), the heat transfer member 38*b*, the bracket 16, the heat transfer member 38*a* (or the cover 150*a*) and the front windshield F.

Furthermore, the imaging unit according to the second embodiment is provided with a third heat transfer path in which heat is transferred in an order of the imaging element 22*b*, the imaging element substrate 22*a*, the heat transfer member 38*a* and the front windshield F, and a fourth heat transfer path in which the heat is transferred in an order of the electronic component 30*b*, the image processing substrate 30*a* and the heat transfer member 38*b*. The heat of the imaging element substrate 22*a* and the image processing substrate 30*a* is directly transferred to the heat transfer members 38*a*, 38*b* without being transferred through the chassis 15, and thereby the heat is transferred efficiently.

Accordingly, the heat inside the chassis 15 can be transferred effectively from the inside of the chassis 15 having small heat capacity to the outside of the chassis 15 having great heat capacity.

Moreover, in the imaging unit according to the fifth embodiment, the heat transfer member 380 is arranged between an inner surface of the chassis 15 and the electronic component 300*b*, and the respective surfaces of the chassis 15 are subjected to a variety of treatments taking account of radiation rates, solar light absorptance or the like.

Therefore, according to the first to fifth embodiments, since heat generated by an imaging element or an electronic component is transferred to the atmosphere via a heat transfer member, an imaging unit, in which a rise in inside temperature can be suppressed, is provided. According to the above-described configuration of the imaging unit, degradation of characteristics of internal components due to the rise in temperature can be suppressed, and thereby degradation of functions of the imaging unit can be suppressed. Therefore, a fault risk of the internal components can be reduced, and it leads to a long service life of the imaging unit.

Moreover, according to the first to fifth embodiments, an imaging unit is provided, in which even in the case of a marked rise in temperature inside a vehicle, such as in daytime in the summer, an influence of solar radiation can be suppressed, and transferring heat to the outside or releasing heat can be performed efficiently.

Moreover, in each of the imaging units according to the first to fifth embodiments, heat generated by an internal component, such as an imaging element, can be transferred efficiently to the atmosphere by forming a heat transfer path by using characteristics of the members. Then, a heat radiation component, such as a heat sink or a fan, or a structure, such as a sunshade, becomes unnecessary, and miniaturization and weight reduction of the imaging unit can be realized.

Furthermore, according to the first to fifth embodiments, even in the case where in the future the technology in speeding up systems or the technology in miniaturizing stereo cameras further progresses, heat will not be accumulated in a chassis of the imaging unit, and the characteristic of the imaging unit will not be degraded.

Further, the present invention is not limited to these embodiments, but various variations and modifications may be made without departing from the scope of the present invention.

The present application is based on and claims the benefit of priority of Japanese Priority Application No. 2014-136039 filed on Jul. 1, 2014, the entire contents of which are hereby incorporated by reference.

What is claimed is:

1. An imaging unit, comprising:
    a plurality of imaging devices configured to capture images of an object;
    a circuit substrate configured to generate image data based on the images captured by the plurality of imaging devices;
    a chassis that holds the plurality of imaging devices; and
    a heat transfer member including a contacting portion configured to contact an installed member in a case where the imaging unit is installed on the installed member, the heat transfer member contacting the chassis or the circuit substrate, heat conductivity of the heat transfer member being greater than the heat conductivity of the chassis.

2. The imaging unit as claimed in claim 1, wherein the heat transfer member is arranged so as to contact a region of the chassis between the plurality of imaging devices.

3. The imaging unit as claimed in claim 1, wherein the circuit substrate includes:
    an imaging element substrate, provided to each of the plurality of imaging devices, configured to generate an electric signal based on an image captured by the imaging device; and
    an image processing substrate configured to generate the image data based on the electric signal.

4. The imaging unit as claimed in claim 1, wherein the circuit substrate is attached to the chassis by a fastening member in a region where the circuit substrate contacts the chassis.

5. The imaging unit as claimed in claim 1, wherein the heat transfer member is attached to the circuit substrate via the chassis.

6. The imaging unit as claimed in claim 1, wherein the heat transfer member directly contacts the circuit substrate.

7. The imaging unit as claimed in claim 3, wherein the heat transfer member contacts both the imaging element substrate and the image processing substrate.

8. The imaging unit as claimed in claim 1, wherein a material of the heat transfer member is aluminum.

9. The imaging unit as claimed in claim 1, wherein the heat transfer member is provided so as to contact the chassis between the plurality of imaging devices, and the circuit substrate includes an imaging element substrate of the imaging device and an image processing substrate configured to process an image captured by the imaging device.

10. An imaging unit, comprising:
    a plurality of imaging devices configured to capture images of an object;
    a circuit substrate configured to generate image data based on the images captured by the plurality of imaging devices, the circuit substrate including an image processing substrate configured to generate the image data based on electric signals generated based on the images;
    a chassis that holds the plurality of imaging devices; and
    a heat transfer member arranged so as to contact the chassis and the image processing substrate inside the chassis, wherein
    the chassis includes a treated surface that reduces solar light absorptance, and
    the treated surface is opposed to an installed member when the imaging unit is installed on the installed member.

11. The imaging unit as claimed in claim 10, wherein an inner surface of the chassis reduces a radiation rate.

12. The imaging unit as claimed in claim 10, wherein a material of the heat transfer member is aluminum.

13. An imaging unit, comprising:
    a plurality of imaging devices configured to capture images of an object;
    a circuit substrate configured to generate image data based on the images captured by the plurality of imaging devices, the circuit substrate including an image processing substrate configured to generate the image data based on electric signals generated based on the images;
    a chassis that holds the plurality of imaging devices; and
    a heat transfer member arranged so as to contact the chassis and the image processing substrate inside the chassis, wherein
    the chassis includes a treated surface that increases a radiation rate on a surface other than the treated surface, and
    the surface is opposed to an installed member when the imaging unit is installed on the installed member.

14. The imaging unit as claimed in claim 13, wherein an inner surface of the chassis is reduces a radiation rate.

15. The imaging unit as claimed in claim 13, wherein a material of the heat transfer member is aluminum.

* * * * *